(12) United States Patent
Tanimura

(10) Patent No.: US 10,539,075 B2
(45) Date of Patent: Jan. 21, 2020

(54) HEAT STORAGE MECHANISM OF HEAT EXCHANGER

(71) Applicant: KAWASAKI JUKOGYO KABUSHIKI KAISHA, Kobe-shi, Hyogo (JP)

(72) Inventor: Kazuhiko Tanimura, Akashi (JP)

(73) Assignee: KAWASAKI JUKOGYO KABUSHIKI KAISHA, Hyogo, Kobe-shi (JP)

( * ) Notice: Subject to any disclaimer, the term of this patent is extended or adjusted under 35 U.S.C. 154(b) by 538 days.

(21) Appl. No.: 14/926,721

(22) Filed: Oct. 29, 2015

(65) Prior Publication Data

US 2016/0047310 A1 Feb. 18, 2016

Related U.S. Application Data

(63) Continuation of application No. PCT/JP2014/060613, filed on Apr. 14, 2014.

(30) Foreign Application Priority Data

May 8, 2013 (JP) .................................. 2013-098450

(51) Int. Cl.
*F02C 7/10* (2006.01)
*F02C 7/08* (2006.01)
(Continued)

(52) U.S. Cl.
CPC ................ *F02C 7/10* (2013.01); *F01D 19/00* (2013.01); *F01D 19/02* (2013.01); *F01K 3/00* (2013.01);
(Continued)

(58) Field of Classification Search
CPC .......... F01D 19/00; F01D 19/02; F01D 25/10; F01K 3/00; F01K 3/02; F01K 13/02; F02C 7/08; F02C 7/10; F02C 7/12
(Continued)

(56) References Cited

U.S. PATENT DOCUMENTS 1,514,441 A * 11/1924 Culp ....................... F01N 1/084
                                                                    181/265
2,104,974 A *  1/1938 Dawes ................... F02M 31/18
                                                                    122/15.1
(Continued)

FOREIGN PATENT DOCUMENTS

CN      101270292 A      9/2008
CN      201145502 Y     11/2008
(Continued)

OTHER PUBLICATIONS

English Translation of the International Preliminary Report on Patentability dated Nov. 19, 2015 in Application No. PCT/JP2014/060613.

(Continued)

*Primary Examiner* — William H Rodriguez
*Assistant Examiner* — Kyle Robert Thomas
(74) *Attorney, Agent, or Firm* — Sughrue Mion, PLLC

(57) ABSTRACT

A heat storage mechanism, of a heat exchanger, which does not shorten the service life of the heat exchanger even when a facility using the heat exchanger is intermittently operated and which suppresses a decrease in efficiency at the time of restart of the facility, is provided. The heat storage mechanism for storing heat of a heat exchanger during stop of operation of a facility provided with the heat exchanger includes an outflow prevention unit configured to prevent outflow of an exhaust gas to the outside, which is a heating medium of the heat exchanger, during stop of operation of (Continued)

the facility is provided in an exhaust passage through which the exhaust gas is discharged to the outside.

12 Claims, 4 Drawing Sheets

(51) Int. Cl.
    *F01K 3/02*     (2006.01)
    *F01K 13/02*     (2006.01)
    *F01D 19/02*     (2006.01)
    *F01K 3/00*     (2006.01)
    *F01D 19/00*     (2006.01)
    *F02C 7/12*     (2006.01)
    *F28D 20/00*     (2006.01)

(52) U.S. Cl.
    CPC ............... *F01K 3/02* (2013.01); *F01K 13/02* (2013.01); *F02C 7/08* (2013.01); *F02C 7/12* (2013.01); *F28D 20/00* (2013.01); *F28D 2020/0013* (2013.01)

(58) Field of Classification Search
    USPC ............... 165/4, 5, 10, 52; 122/14.3, 14.31; 126/292, 297
    See application file for complete search history.

(56) References Cited

U.S. PATENT DOCUMENTS

| | | | |
|---|---|---|---|
| 3,717,994 A | 2/1973 | Templin | |
| 4,215,814 A * | 8/1980 | Ebert | F23M 9/006 126/307 A |
| 4,320,869 A * | 3/1982 | Ebert | F23M 9/006 126/307 A |
| 4,442,798 A * | 4/1984 | Zanias | F23L 11/005 110/147 |
| 4,528,012 A | 7/1985 | Sturgill | |
| 2002/0152754 A1* | 10/2002 | MacKay | F02C 1/06 60/772 |
| 2010/0021284 A1* | 1/2010 | Watson | B60L 7/10 415/123 |
| 2011/0076166 A1* | 3/2011 | Godeke | F01D 5/025 417/410.1 |
| 2012/0312496 A1 | 12/2012 | Howes et al. | |

FOREIGN PATENT DOCUMENTS

| | | | |
|---|---|---|---|
| CN | 201425317 Y | | 3/2010 |
| CN | 202074534 U | * | 12/2011 |
| CN | 102869854 A | | 1/2013 |
| EP | 1895095 A1 | | 3/2008 |
| JP | 04-301143 A | | 10/1992 |
| JP | 2005002892 A | | 1/2005 |
| JP | 2006-052738 A | | 2/2006 |
| JP | 2007-247565 A | | 9/2007 |
| WO | 2011104556 A2 | | 9/2011 |

OTHER PUBLICATIONS

Communication dated Sep. 1, 2016 from the Canadian Intellectual Property Office in counterpart Application No. 2,910,936.
Communication dated Nov. 30, 2016, issued by the European Patent Office in corresponding European Application No. 14794302.1.
International Search Report for PCT/JP2014/060613 dated May 13, 2014 [PCT/ISA/210].
Notification of Reason(s) for Rejection dated Feb. 18, 2014 on Corresponding JP Appln. No. 2013-098450.
Decision of Rejection dated Apr. 30, 2014 on Corresponding JP Appln. No. 2013-098450.
Decision of Grant dated Oct. 21, 2014 on Corresponding JP Appln. No. 2013-098450.
Communication dated Jun. 13, 2016, issued by the State Intellectual Property Office of the P.R.C. in corresponding Chinese Application No. 201480025554.5.
Communication dated Jan. 26, 2017, issued by the State Intellectual Property Office of the P.R.C. in corresponding Chinese Application No. 201480025554.5.
Notification of Reason(s) for Rejection for 2013-098450 dated Feb. 18, 2014.
Notification of Reason(s) for Rejection for 2013-098450 dated Apr. 30, 2014.
Notification of Reason(s) for Rejection for 2013-098450 dated Oct. 21, 2014.
English Translation of the International Preliminary Report on Patentability dated Nov. 19, 2015 in Application No. PCT/JP2014/060619.

* cited by examiner

HEAT STORAGE MECHANISM OF HEAT EXCHANGER

CROSS REFERENCE TO THE RELATED APPLICATION

This application is a continuation application, under 35 U.S.C. § 111(a), of international application No. PCT/JP2014/060613, filed Apr. 14, 2014, which claims priority to Japanese patent application No. 2013-098450, filed May 8, 2013, the disclosure of which are incorporated by reference in their entirety into this application.

BACKGROUND OF THE INVENTION

Field of the Invention

The present invention relates to a mechanism for storing heat of a heat exchanger during stop of operation of a facility provided with the heat exchanger, such as a regenerative gas turbine.

Description of Related Art

In recent years, as a solution for the environmental problems and energy problems, utilization of natural energy, such as solar power generation and wind power generation, has been proposed. However, when power is generated by utilizing natural energy, the amount of power generation greatly varies depending on the natural environment. Thus, in order to stably supply power, it is conceivable that a regenerative gas turbine including a regenerative heat exchanger is used in combination as highly-efficient power generation means which is highly responsive to a load and is intended to compensate for variation of supplied power. In the regenerative gas turbine, compressed air from a compressor is heated with a high-temperature exhaust gas from a turbine as a heating medium and is introduced into a combustor, thereby increasing the thermal efficiency (e.g., see Patent Document 1).

RELATED DOCUMENT

Patent Document

[Patent Document 1] JP Laid-open Patent Publication No. 2006-052738

SUMMARY OF THE INVENTION

The regenerative heat exchanger provided in the regenerative gas turbine exchanges heat between working fluids at the compressed air side from the compressor (low-temperature high-pressure side) and at the exhaust gas side (high-temperature low-pressure side). Thus, a temperature distribution within the regenerative heat exchanger becomes ununiform, and accordingly, thermal stress occurs in the regenerative heat exchanger. In particular, in the case where the gas turbine is intermittently operated, when the gas turbine is restarted, great thermal stress occurs until the temperature of the regenerative heat exchanger reaches its rated temperature from a low-temperature state, which causes a decrease in usage count-based service life of the regenerative heat exchanger. Furthermore, in order to achieve high efficiency, a large-size regenerative heat exchanger is preferably used. However, since the large-size regenerative heat exchanger has a large thermal capacity, when the large-size regenerative heat exchanger is restarted from a low-temperature state, a long period of time is taken from start with low thermal efficiency until reaching rated high efficiency.

Therefore, in order to solve the above-described problem, an object of the present invention is to provide a heat storage mechanism, of a heat exchanger, which does not shorten the service life of the heat exchanger even when a facility using the heat exchanger is intermittently operated and which suppresses a decrease in efficiency when the facility is restarted.

In order to achieve the above-described object, a heat storage mechanism of a heat exchanger according to the present invention is a heat storage mechanism, of a heat exchanger, for storing heat of the heat exchanger during stop of operation of a facility in which the heat exchanger is provided, the heat storage mechanism comprising: an outflow prevention unit, provided in an exhaust passage through which a heating medium of the heat exchanger is discharged to an outside, to prevent the heating medium from flowing out to the outside during stop of operation of the facility. The facility may be, for example, a regenerative gas turbine including a regenerative heat exchanger which heats compressed air from a compressor with an exhaust gas from a turbine as a heating medium and introduces the heated compressed air into a combustor.

According to this configuration, the high-temperature heating medium is prevented from flowing out to the outside during stop of operation of the facility, and accumulates near the heat exchanger. Thus, it is possible to suppress a decrease in the temperature of the heat exchanger during stop of operation by utilizing exhaust heat of the facility. Accordingly, great thermal stress is prevented from occurring in the heat exchanger at the time of restart of the facility, and thus shortening of the usage count-based service life of the heat exchanger is suppressed even when intermittent operation is repeated. In addition, it is possible to shorten a time period until reaching the rated temperature of the heat exchanger, to suppress a decrease in efficiency.

In a heat storage mechanism of a heat exchanger according to one embodiment of the present invention, the outflow prevention unit may include: a bent portion, provided in the exhaust passage, for turning around an exhaust gas that has passed through the heat exchanger and flowed upward, such that the exhaust gas is directed downward; and a deflection portion, provided at a downstream side of the bent portion, for deflecting the exhaust gas flowing downward from the bent portion such that the exhaust gas is directed in a horizontal direction or upward. According to this configuration, it is possible to assuredly cause the high-temperature exhaust gas to accumulate in the bent portion, by low-temperature air accumulating in the deflection portion at the downstream side of (below) the bent portion. Thus, only by adding a simple structure to a portion downstream of the heat exchanger, it is possible to effectively suppress a decrease in the temperature of the heat exchanger during stop of operation.

In a heat storage mechanism of a heat exchanger according to one embodiment of the present invention, the deflection portion may have an introduction portion into which an exhaust gas flows, and a height position of the introduction portion may be set lower than a lower end of the heat exchanger.

In a heat storage mechanism of a heat exchanger according to one embodiment of the present invention, the deflection portion may be provided with an air introduction valve configured to be opened during stop of operation of the facility to introduce outside air into the deflection portion.

According to this configuration, it is possible to introduce the low-temperature air into the deflection portion according to need. Thus, it is possible to further assuredly cause the high-temperature heating medium to accumulate in the bent portion.

In a heat storage mechanism of a heat exchanger according to an embodiment of the present invention, the outflow prevention unit may include an on-off valve, disposed in the exhaust passage and at a downstream side of the heat exchanger, for closing the exhaust passage during stop of operation. According to this configuration, it is possible to suppress a decrease in the temperature of the heat exchanger during stop of operation while an increase in the dimension of the entire facility is suppressed.

Any combination of at least two constructions, disclosed in the appended claims and/or the specification and/or the accompanying drawings should be construed as included within the scope of the present invention. In particular, any combination of two or more of the appended claims should be equally construed as included within the scope of the present invention.

BRIEF DESCRIPTION OF THE DRAWINGS

In any event, the present invention will become more clearly understood from the following description of embodiments thereof, when taken in conjunction with the accompanying drawings. However, the embodiments and the drawings are given only for the purpose of illustration and explanation, and are not to be taken as limiting the scope of the present invention in any way whatsoever, which scope is to be determined by the appended claims. In the accompanying drawings, like reference numerals are used to denote like parts throughout the several views, and:

DESCRIPTION OF EMBODIMENTS

Figure 1:
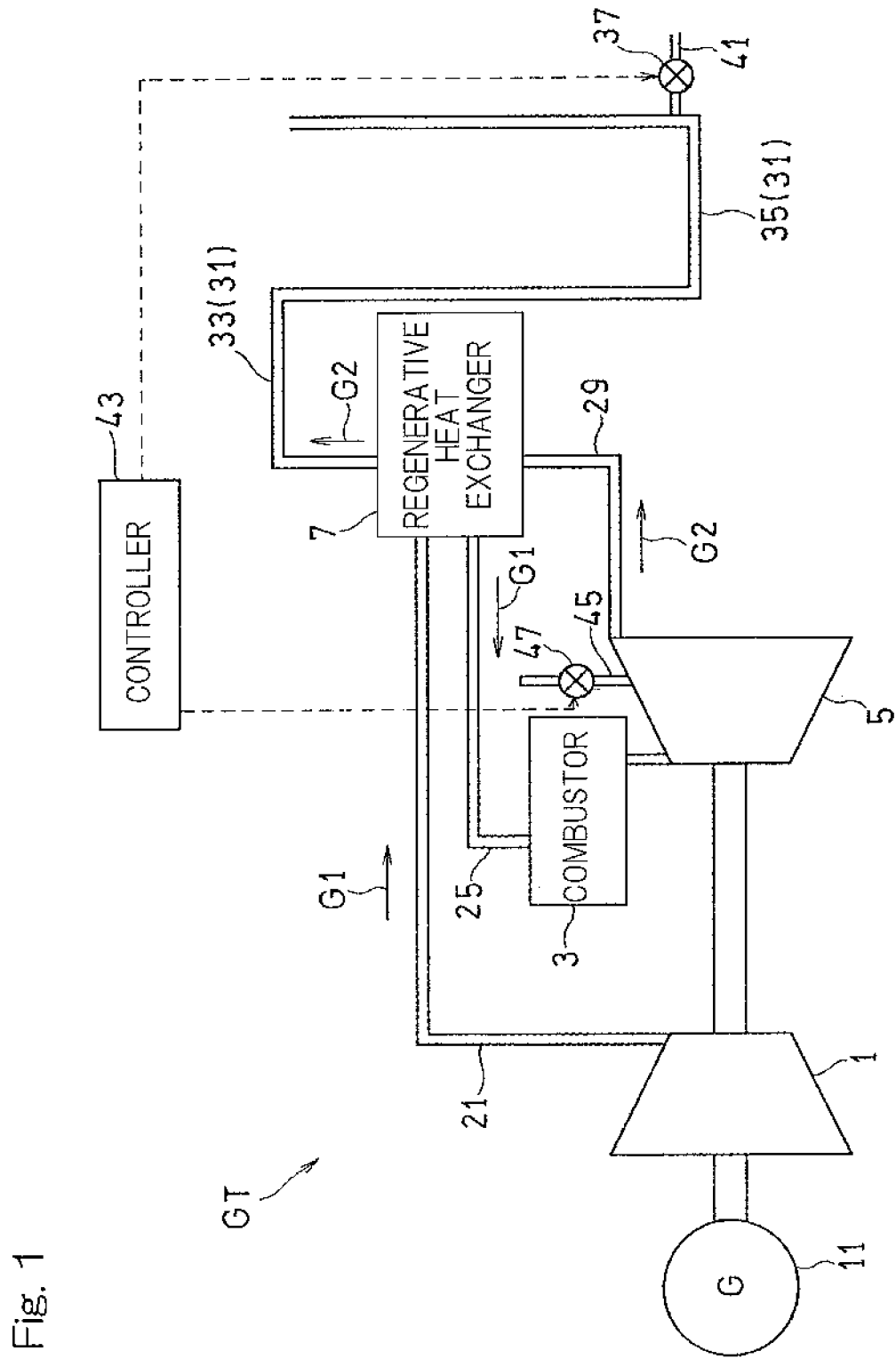
FIG. 1 is a block diagram showing a schematic configuration of a regenerative gas turbine including a heat storage mechanism according to a first embodiment of the present invention.

Hereinafter, embodiments of the present invention will be described with reference to the drawings. FIG. 1 is a schematic configuration diagram showing a regenerative gas turbine GT which is a facility including a heat storage mechanism of a heat exchanger according to a first embodiment of the present invention. The regenerative gas turbine GT includes a compressor 1, a single-can type combustor 3, a turbine 5, and a regenerative heat exchanger 7 as a heat exchanger including a heat storage mechanism. A generator 11 is driven by output of the regenerative gas turbine GT.

The regenerative heat exchanger 7 heats a low-temperature high-pressure compressed gas G1 to be introduced from the compressor 1 into the combustor 3, utilizing a high-temperature and low-pressure exhaust gas G2 from the turbine 5 as a heating medium. In other words, the regenerative heat exchanger 7 exchanges heat between the compressed gas G1 which is a medium to be heated and the exhaust gas G2 which is a heating medium. Specifically, the compressed gas G1 from the compressor 1 is sent via a compressed gas passage 21 to the regenerative heat exchanger 7, is heated by the regenerative heat exchanger 7, and then is sent via a high-temperature compressed gas passage 25 to the combustor 3. The exhaust gas G2 having passed through the combustor 3 and the turbine 5 flows through the exhaust passage 29 into the regenerative heat exchanger 7 as a heating medium. During operation of the regenerative gas turbine GT, the exhaust gas G2 having flowed out from the regenerative heat exchanger 7 passes through a silencer, which is not shown, to be silenced, and then is released through the exhaust passage 29 to the outside.

On the other hand, during stop of operation of the regenerative gas turbine GT, major part of the exhaust gas G2 having flowed out from the regenerative heat exchanger 7 accumulates in a portion of the exhaust passage 29 downstream of the regenerative heat exchanger 7, by an outflow prevention unit 31 provided in the exhaust passage 29, without being discharged to the outside.

Specifically, the regenerative gas turbine GT according to the present embodiment includes, as the outflow prevention unit 31, a bent portion 33 which turns around the exhaust gas G2 that has passed through the regenerative heat exchanger 7 and flowed upward, such that the exhaust gas G2 is directed downward, and a deflection portion 35 which deflects the exhaust gas G2 directed downward by the bent portion 33, such that the exhaust gas G2 is directed in a horizontal direction or upward. Furthermore, the deflection portion 35 is provided with an air introduction valve 37 for introducing outside air into the deflection portion 35.

Figure 2:
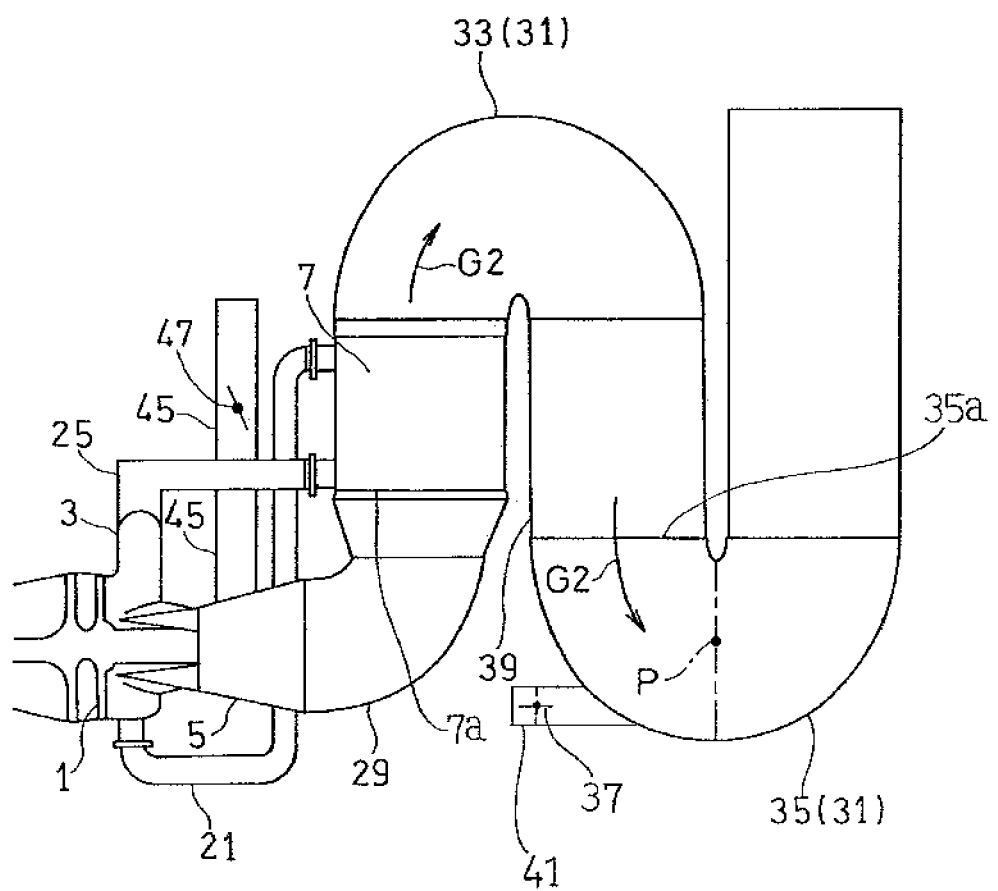
FIG. 2 is a schematic diagram showing a portion of the heat storage mechanism in FIG. 1.

As shown in FIG. 2, the bent portion 33 is formed as a U-shaped tube which is bent from upward to downward by substantially 180°. In addition, the deflection portion 35 is disposed at the downstream side of and below the bent portion 33, and is formed as a U-shaped tube which is bent from downward to upward by substantially 180°. The bent portion 33 and the deflection portion 35 are connected to each other via a connection tube portion 39 which extends straight. The deflection portion 35 has an introduction portion 35a into which the exhaust gas G2 flows, and the height position of the introduction portion 35a is set lower than the height position of a lower end 7a of the regenerative heat exchanger 7 by adjusting the length of the straight connection tube portion 39. By so setting the height position of the introduction portion 35a of the deflection portion 35, it is possible to block natural convection, and thus it is possible to assuredly suppress a decrease in the temperature of the regenerative heat exchanger 7.

The bent portion 33 suffices to have a shape which is able to ensure a space in which the high-temperature exhaust gas G2 that has flowed out upward from the regenerative heat exchanger 7 accumulates. The bend angle is not limited to 180°. However, in order to effectively prevent outflow of the exhaust gas G2 and to suppress an increase in installation space of the entire facility, the bend angle may be substantially 180°. Similarly, the deflection portion 35 also suffices to have a shape which is able to ensure a space in which low-temperature air accumulates and the deflection angle is not limited to 180°. However, in the shown example, the deflection angle is set at substantially 180°, in order to effectively trap the exhaust gas G2 in the bent portion 33 by means of air accumulating in the deflection portion 35 and to suppress an increase in installation space of the entire facility.

Specifically, the air introduction valve 37 is provided in an air introduction tube 41 which is connected to an upstream portion of the deflection portion 35. The air introduction valve 37 closes the air introduction tube 41 during operation of the regenerative gas turbine GT as shown by the broken line. On the other hand, the air introduction valve 37 is opened during stop of the regenerative gas turbine GT as shown by the solid line. The aperture of the air introduction valve 37 is controlled by a controller 43 shown in FIG. 1. The controller 43 also controls overall operation of the regenerative gas turbine GT. The position of the provided air introduction valve 37 relative to the deflection portion 35 is not limited to the example shown in FIG. 2. However, in order to efficiently cause low-temperature outside air to accumulate in a curved portion of the deflection portion 35, the air introduction valve 37 is preferably disposed below a midpoint P in the vertical direction between a lower end at the outer peripheral side and a lower end at the inner peripheral side of a U-shaped tube member forming the deflection portion. The air introduction tube 41 may be connected to a downstream portion of the deflection portion 35. The air introduction valve 37 and the air introduction tube 41 may be omitted. In this case as well, the exhaust gas G2 at the downstream side of the deflection portion 35 has a high temperature, and thus gradually comes out upward, and instead, low-temperature outside air flows into the deflection portion 35. The air having entered the deflection portion 35 is blocked by the exhaust gas G2 within the connection tube portion 39 and the bent portion 33, and thus does not reach the regenerative heat exchanger 7.

A communication passage 45 which provides communication between the inside and the outside of the regenerative gas turbine GT is connected to the turbine 5, and a turbine on-off valve 47 is provided in the communication passage 43. During stop of operation of the regenerative gas turbine GT, the turbine on-off valve 47 is opened to introduce outside air into the turbine 5, thereby preventing the temperature of the exhaust gas G2 from excessively rising at the time of restart. Meanwhile, also at the time of restart of the regenerative gas turbine GT, the turbine on-off valve 47 is opened to discharge a part of the exhaust gas G2, whereby it is possible to adjust the amount of the exhaust gas G2 flowing into the regenerative heat exchanger 7 to prevent the temperature of the regenerative heat exchanger 7 from rapidly rising at the time of restart. The aperture of the turbine on-off valve 47 is controlled by the controller 43 (FIG. 1).

Figure 3:
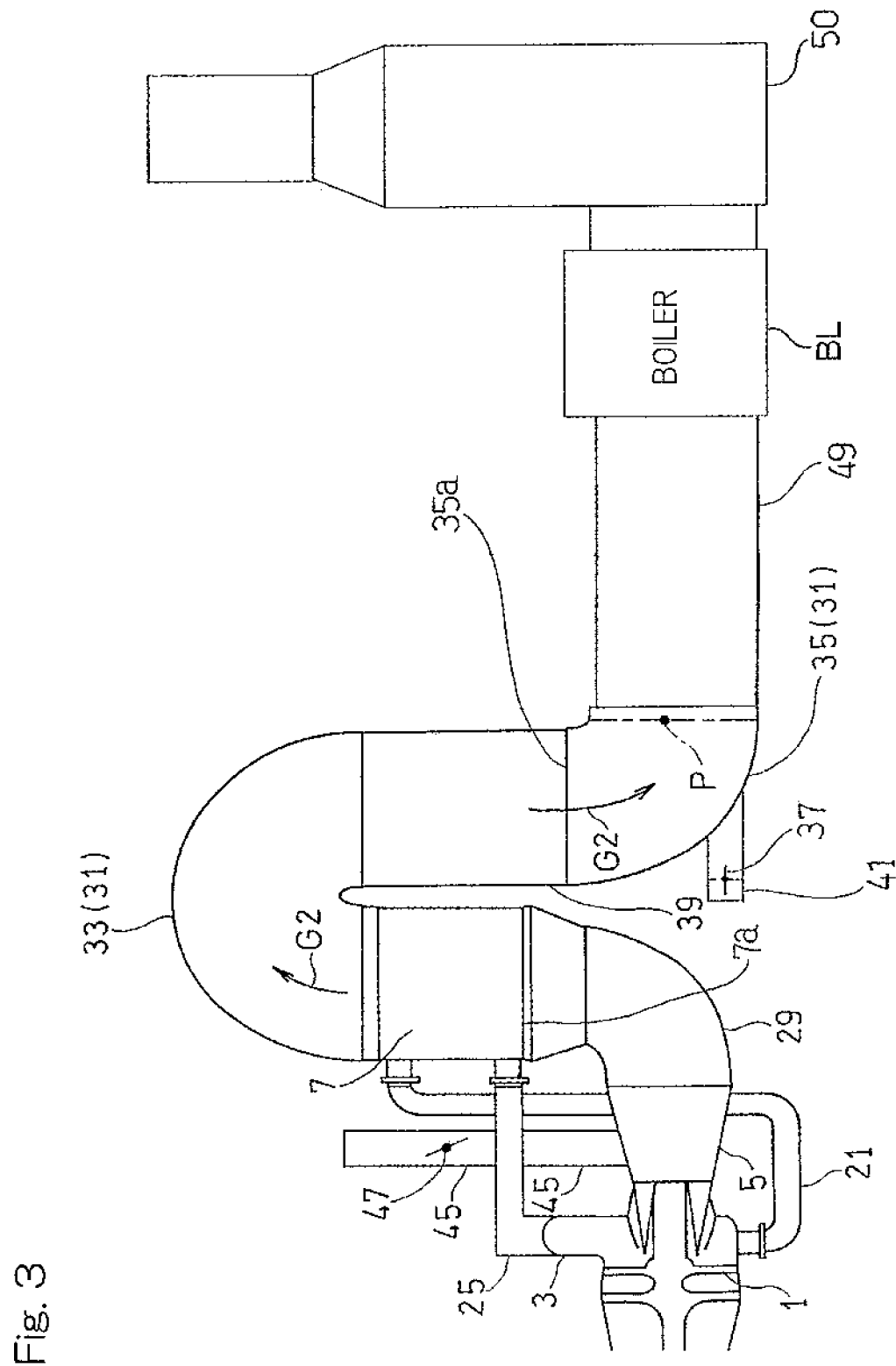
FIG. 3 is a schematic diagram showing a modification of the heat storage mechanism in FIG. 2.

As shown in FIG. 3, the exhaust gas G2 having passed through the deflection portion 35 may be sent to another facility, for example, a boiler BL, to thereby further utilize exhaust heat of the exhaust gas G2. In this case, preferably, the deflection angle of the deflection portion 35 is set at substantially 90° (horizontal direction), and the height position of an uppermost portion of a connection flow passage 49 which connects the deflection portion 35 to the boiler is set lower than the height position of the lower end 7a of the regenerative heat exchanger 7. The exhaust gas G2 having passed through the boiler BL is discharged upward through an exhaust duct 50 provided at downstream of the boiler BL.

As described above, with the heat storage structure of the heat exchanger according to the present embodiment, since the outflow prevention unit 31 is provided, it is possible to prevent a decrease in the temperature of the regenerative heat exchanger 7 during stop of operation of the gas turbine GT by utilizing exhaust heat from the regenerative gas turbine GT. Thus, great thermal stress is prevented from occurring in the regenerative heat exchanger 7 at the time of restart of the regenerative gas turbine GT, and hence shortening of the usage count-based service life of the regenerative heat exchanger 7 is suppressed even when intermittent operation is repeated. In addition, it is possible to shorten a time period until reaching the rated temperature of the regenerative heat exchanger 7, to suppress a decrease in efficiency. In particular, in the present embodiment, it is possible to assuredly cause the high-temperature exhaust gas G2 to accumulate in the bent portion 33, by low-temperature air accumulating in the deflection portion 35 at the downstream side of (below) the bent portion 33. Thus, only by adding the bent portion 33 having a simple structure to the portion downstream of the regenerative heat exchanger 7, it is possible to effectively suppress a decrease in the temperature of the regenerative heat exchanger 7 during stop of operation.

Next, a regenerative gas turbine GT according to a second embodiment of the present invention shown in FIG. 4 will be described. In the following description, the difference from the above-described first embodiment will be described in detail, and the description of the same configuration as in the first embodiment is omitted.

In the present embodiment, as the outflow prevention unit 31, an exhaust passage on-off valve 51 is provided in the exhaust passage 29. Specifically, a plurality of exhaust passage on-off valves 51 are provided in the exhaust passage 29 so as to be aligned in a transverse direction of the exhaust passage 29. The exhaust passage on-off valves 51 are disposed on the downstream side of the regenerative heat exchanger 7 in the exhaust passage 29. Each exhaust passage on-off valve 51 opens the exhaust passage 29 during operation of the regenerative gas turbine GT as shown by the broken line, and closes the exhaust passage 29 during stop of operation as shown by the solid line. By providing the exhaust passage on-off valves 51 in the exhaust passage 29 to prevent outflow of exhaust gas 51, it is possible to suppress a decrease in the temperature of the regenerative heat exchanger 7 during stop of operation while an increase in the dimension of the entire gas turbine GT is suppressed.

Figure 4:
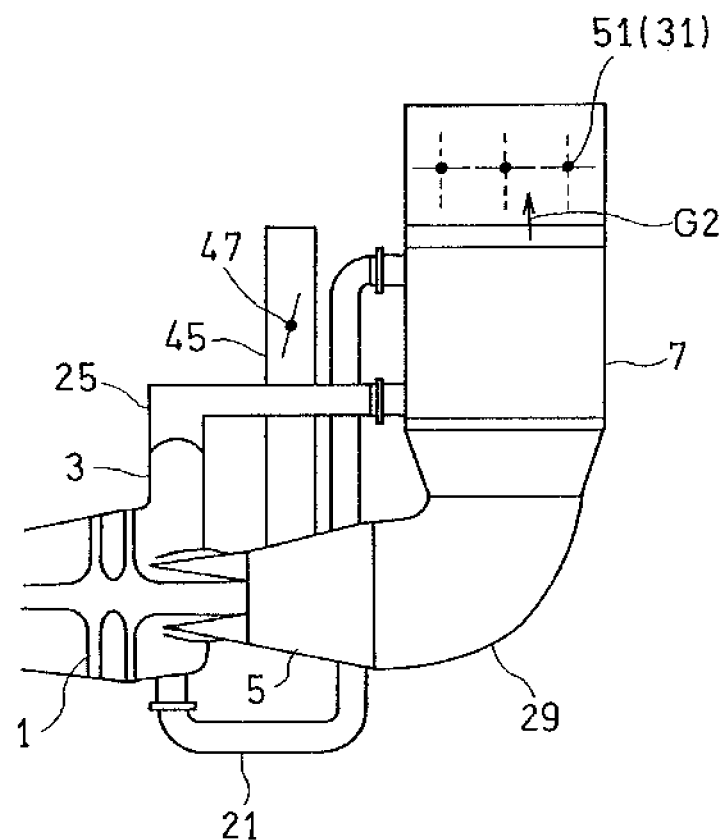
FIG. 4 is a schematic diagram showing a portion of a regenerative gas turbine including a heat storage mechanism according to a second embodiment of the present invention.

In the second embodiment in FIG. 4, as the outflow prevention unit 31, the exhaust passage on-off valves 51 are provided instead of the bent portion 33 in the first embodiment. However, the exhaust passage on-off valves 51 may be provided in addition to the bent portion 33 in the first embodiment.

The heat storage mechanism of the heat exchanger according to the present invention is applicable to, not limited to the gas turbine engine GT, but to various facilities that utilize exhaust heat for heating in a heat exchanger.

Although the present invention has been fully described in connection with the embodiments thereof with reference to the accompanying drawings which are used only for the purpose of illustration, those skilled in the art will readily conceive numerous changes and modifications within the framework of obviousness upon the reading of the specification herein presented of the present invention. Accordingly, such changes and modifications are, unless they depart from the scope of the present invention as delivered from the claims annexed hereto, to be construed as included therein.

REFERENCE NUMERALS

1 . . . Compressor
3 . . . Combustor
5 . . . Turbine
7 . . . Regenerative heat exchanger (Heat exchanger)
29 . . . Exhaust passage
31 . . . Outflow prevention unit
33 . . . Bent portion
35 . . . Deflection portion 51 . . . Exhaust passage on-off valve
G2 . . . Exhaust gas (Heating medium)
GT . . . Regenerative gas turbine (Facility)

What is claimed is:

1. A heat storage mechanism, comprising:
a bent portion that is downstream of a heat exchanger and that directs exhaust gas, that has passed through the heat exchanger in an upward direction, in a downward direction,
wherein the heat exchanger is configured to discharge the exhaust gas upward;
a connection tube portion that connects the bent portion and a deflection portion; and
the deflection portion that is downstream of the bent portion and that is disposed substantially 90° in relation to the connection tube portion for deflecting the exhaust gas flowing downward from the bent portion such that the exhaust gas is directed in a substantially horizontal direction or upward to an outlet of an exhaust passage,
wherein the heat storage mechanism is to store heat of the heat exchanger during stop of operation of a regenerative gas turbine in which the heat exchanger is provided, and
wherein the deflection portion is provided with an air introduction valve configured to be opened, during stop of operation of the regenerative gas turbine, to introduce outside air into the deflection portion.

2. The heat storage mechanism of claim 1, wherein the deflection portion is formed as a U-shaped tube which is bent from downward to upward by substantially 180°.

3. The heat storage mechanism of claim 1, wherein the deflection portion includes an introduction portion into which the exhaust gas flows, and wherein a height position of the introduction portion is lower than another height position of the heat exchanger.

4. The heat storage mechanism of claim 1, wherein the air introduction valve is disposed below a midpoint of the deflection portion in a vertical direction.

5. The heat storage mechanism of claim 1, further comprising:
an exhaust passage valve to prevent outflow of the exhaust gas during the stop of operation of the regenerative gas turbine.

6. A heat storage mechanism, of a heat exchanger, for storing heat of the heat exchanger during stop of operation of a regenerative gas turbine in which the heat exchanger is provided, the heat storage mechanism comprising:
an outflow prevention unit, provided in an exhaust passage through which a heating medium of the heat exchanger is discharged to an outside, to prevent the heating medium from flowing out to the outside during stop of operation of the regenerative gas turbine,
wherein the heat exchanger is configured to discharge the heating medium upward,
wherein the outflow prevention unit includes: a bent portion, provided in the exhaust passage, for turning around the heating medium that has passed through the heat exchanger and flowed upward, such that the heating medium is directed downward; and a deflection portion, provided at a downstream side of the bent portion, for deflecting the heating medium flowing downward from the bent portion such that the heating medium is directed in a substantially horizontal direction or upward to an outlet of the exhaust passage, and
wherein the deflection portion is provided with an air introduction valve configured to be opened, during stop of operation of the regenerative gas turbine, to introduce outside air into the deflection portion.

7. The heat storage mechanism of the heat exchanger as claimed in claim 6, wherein the deflection portion deflects the heating medium upward.

8. The heat storage mechanism of the heat exchanger as claimed in claim 6, wherein the deflection portion has an introduction portion which is a portion into which an exhaust gas flows, and a height position of the introduction portion is lower than a lower end of the heat exchanger.

9. The heat storage mechanism of the heat exchanger as claimed in claim 6, wherein the outflow prevention unit includes an on-off valve, disposed on a downstream side of the heat exchanger in the exhaust passage, configured to close the exhaust passage during stop of operation.

10. A regenerative gas turbine comprising:
a regenerative heat exchanger configured to heat a compressed air from a compressor with an exhaust gas from a turbine as the heating medium and to introduce the heated compressed air into a combustor; and
the heat storage mechanism as claimed in claim 6 as the heat storage mechanism of the regenerative heat exchanger.

11. The heat storage mechanism of the heat exchanger as claimed in claim 6, wherein the deflection portion, deflects the heating medium flowing downward from the bent portion such that the heating medium is directed substantially 90° in relation to a downward direction.

12. The heat storage mechanism of the heat exchanger as claimed in claim 6, further comprising:
a connection tube portion that extends straight downward from the bent portion,
wherein the deflection portion is provided in the form of a tube portion that is bent horizontally or upward from the connection tube portion.

* * * * *